United States Patent [19]

Tanahashi

[11] 4,114,374
[45] Sep. 19, 1978

[54] INTERNAL COMBUSTION ENGINE
[75] Inventor: Toshio Tanahashi, Toyoda, Japan
[73] Assignee: Toyota Jidosha Kogyo Kabushiki Kaisha, Toyota, Japan
[21] Appl. No.: 678,647
[22] Filed: Apr. 20, 1976
[30] Foreign Application Priority Data Nov. 14, 1975 [JP] Japan .................. 50/137423

[51] Int. Cl.$^2$ .................. F02B 75/10; F02M 13/06; F02D 9/00
[52] U.S. Cl. .................. 60/302; 60/282; 123/127; 123/198 F
[58] Field of Search ............ 123/198 F, 127, 119 EC, 123/119 VC; 60/282, 302

[56] References Cited

U.S. PATENT DOCUMENTS

| 2,623,617 | 12/1952 | Snyder | 123/198 F |
| 3,512,510 | 5/1970 | Manning | 123/127 |
| 3,791,144 | 2/1974 | Lang | 60/302 |
| 3,926,158 | 12/1975 | Dolza | 123/127 |
| 4,019,479 | 4/1977 | Garabedian | 123/198 F |

FOREIGN PATENT DOCUMENTS 997,439 9/1951 France .................. 123/119 VC

Primary Examiner—Douglas Hart
Attorney, Agent, or Firm—Stevens, Davis, Millwer & Mosher

[57] ABSTRACT

Disclosed is an internal combustion engine for an automobile having at least one cylinder associated with a primary intake system and another cylinder or cylinders associated with a secondary intake system. Each of the primary and secondary intake systems comprises a choke valve, a throttle valve and a carburetor. The engine includes a throttle valve controlling device adapted for operation in response to a negative pressure fluctuating according to the degree of opening of the throttle valve in the secondary intake system for maintaining the throttle valve in the secondary intake system in the vicinity of its idling position when the throttle valve in the primary intake system is in the vicinity of its idling position and opening fully the throttle valve in the secondary intake system when the throttle valve in the primary intake system is far away from its idling position. Also included is a fuel supply controlling device adapted to close a main fuel passage in the carburetor of the secondary intake system when the throttle valve in the primary intake system is open to an extent narrower than a predetermined level, while opening the main fuel passage when the throttle valve in the primary intake system opens to its predetermined level or wider. Thus, the engine operates at medium or light loads with smaller pumping and friction losses and a smaller fuel consumption and discharges a smaller amount of harmful exhaust gas. The cylinder associated with the primary intake system may be a cylinder having an ordinary combustion chamber or alternatively, a cylinder adapted for operation with a lean fuel-air mixture and having a main combustion chamber and an auxiliary combustion chamber communicating with each other through a passage in which sparking electrodes are located.

10 Claims, 9 Drawing Figures

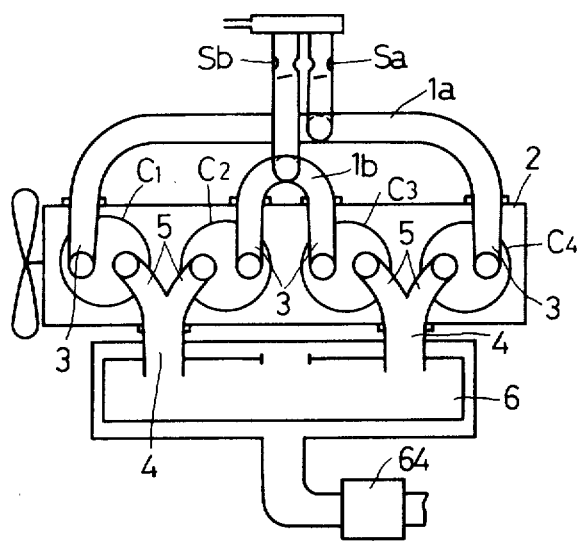
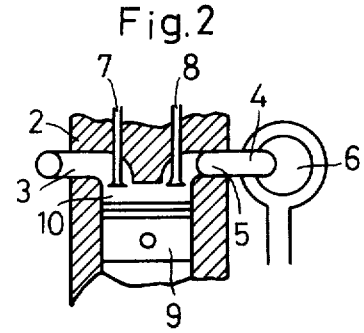
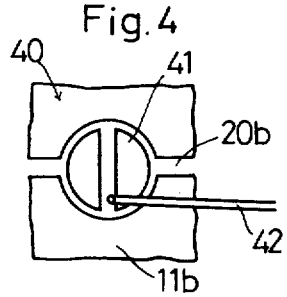
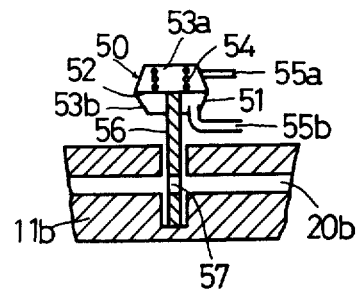
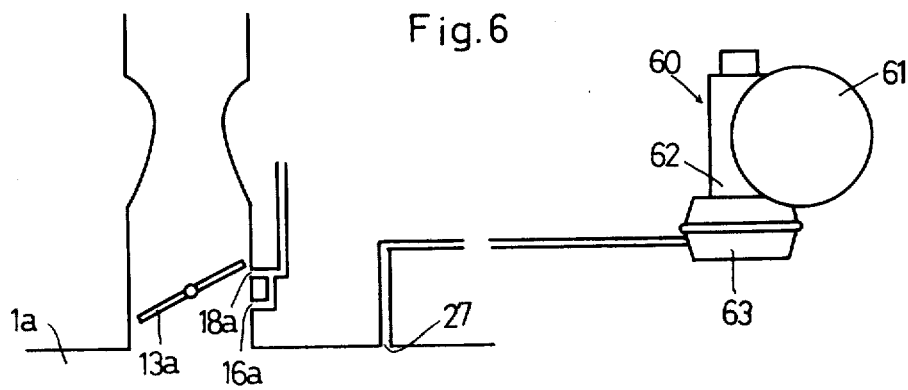

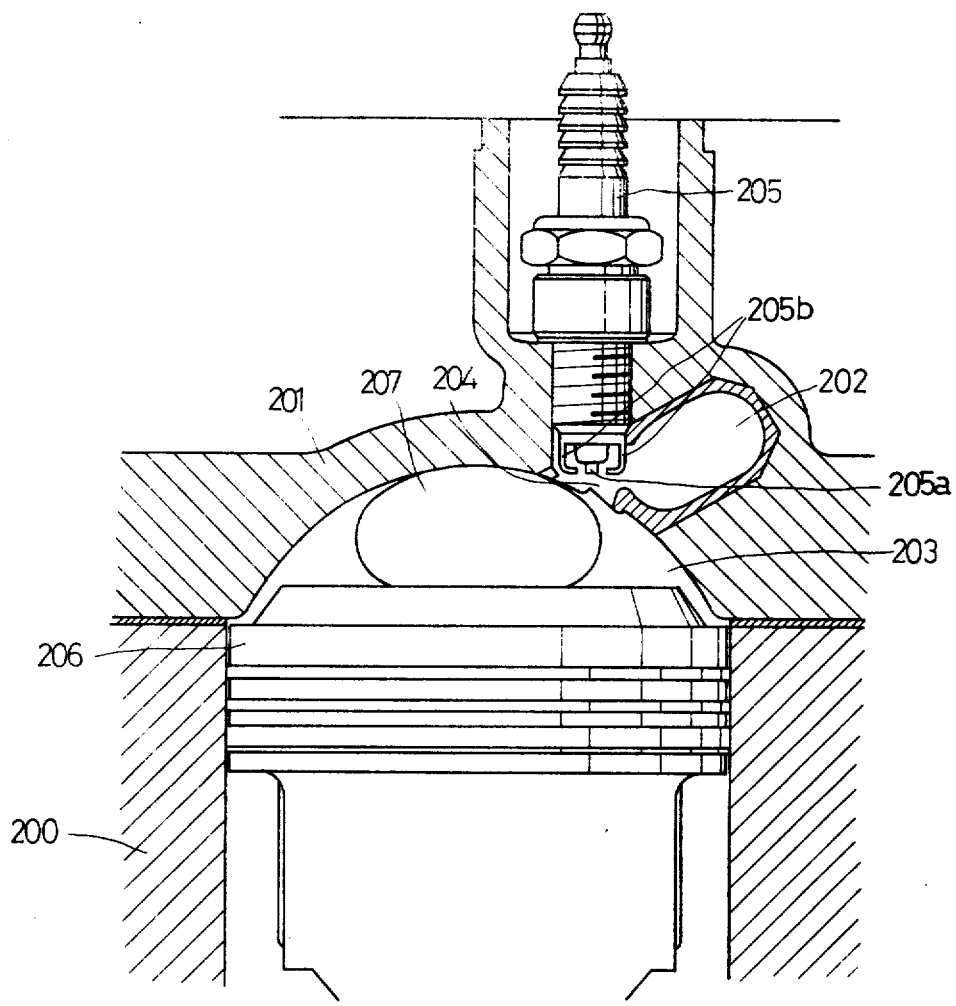

INTERNAL COMBUSTION ENGINE

This invention reltates to an internal combustion engine for an automobile, and more particularly, to an internal combustion engine having a plurality of cylinders operationally separated in two groups each of which is associated with one of a pair of intake systems.

A typical, conventionally known internal combustion engine for an automobile is so designed and constructed as to have a capacity for generating so large a power output as is required for operation at heavy loads to enable the automobile to start, increase its speed or ascend a slope smoothly. Such a large output is, however, not required during operation at medium or light loads and it is necessary to decrease the output by closing a throttle valve. Consequently, the engine suffers large power losses through the so-called pumping losses and those caused by friction between pistons and cylinder walls during operation at medium or light loads. Moreover, reduction in combustion efficiency induces a larger fuel consumption with a resultant increase in the discharge of harmful exhaust gases.

It is an object of this invention to provide an internal combustion engine for an automobile which has only small pumping and friction losses and a high combustion efficiency during operation at medium or light loads.

It is another object of this invention to provide an internal combustion engine for an automobile which is, as a whole, adapted for operation with a very lean fuel-air mixture at medium or light loads, to thereby permit reduction in the amount of harmful components in the exhaust gas, a smaller fuel consumption and virtually total prevention of thermal damage to an exhaust system.

It is another object of this invention to provide an economical, high power internal combustion engine for an automobile, which does not require any air pump for supplying air to burn the uncombusted hydrocarbon (HC) and carbon monoxide (CO) in the exhaust gas.

It is another object of this invention to provide an internal combustion engine for an automobile, which may employ a small reactor of simple construction.

It is still another object of this invention to provide an internal combustion engine for an automobile, wherein fuel-air mixture having an optimum mixing ratio is supplied to each cylinder, whether during operation at heavy loads, idling, deceleration, warming or racing.

it is a further object of this invention to provide an internal combustion engine for an automobile, which can be quickly placed in operation, whether from cold or when restarted.

It is a still further object of this invention to provide an internal combustion engine for an automobile, which can be supported without any run-on.

According to this invention, there is provided an internal combustion engine for an automobile comprising a plurality of cylinders; a primary intake system communicating with at least one of the cylinders and having a carburetor and a throttle valve connected to an accelerator pedal; a secondary intake system communicating with the remainder of the cylinders and having a carburetor and a throttle valve; a negative pressure port provided in the primary intake system adjacent to the throttle valve thereof; a device adapted for controlling the throttle valve in the secondary intake system and having a diaphragm valve adapted for actuation by a negative pressure prevailing at the negative pressure port for maintaining the throttle valve of the secondary intake system in the vicinity of its idling position when the throttle valve of the primary intake system is in the vicinity of its idling position, while allowing the throttle valve of the secondary intake system to fully open after the throttle valve of the primary intake system is considerably turned away from its idling position, and a link work connecting the diaphragm valve with the throttle valve of the secondary intake system; and a fuel supply controlling device adapted to close a main fuel passage in the carburetor in the secondary intake system when the throttle valve in the primary intake system is open to an extend narrower than a predetermined level, but open the main fuel passage upon further opening of the throttle valve in the primary intake system to at least said predetermined level.

The invention will now be described in detail, merely by way of example, with reference to the accompanying drawings, in which:

FIG. 1 is a schematic plan view showing a preferred embodiment of this invention;

FIG. 2 is a fragmentary sectional view in front elevation of the engine shown in FIG. 1;

FIGS. 4 and 5 illustrate two different forms of fuel supply controlling devices;

FIG. 6 illustrates an ignition timing control device;

FIG. 7 is a fragmentary front elevational view partly in section of an engine cylinder having an auxiliary combustion chamber.

Figure 3:
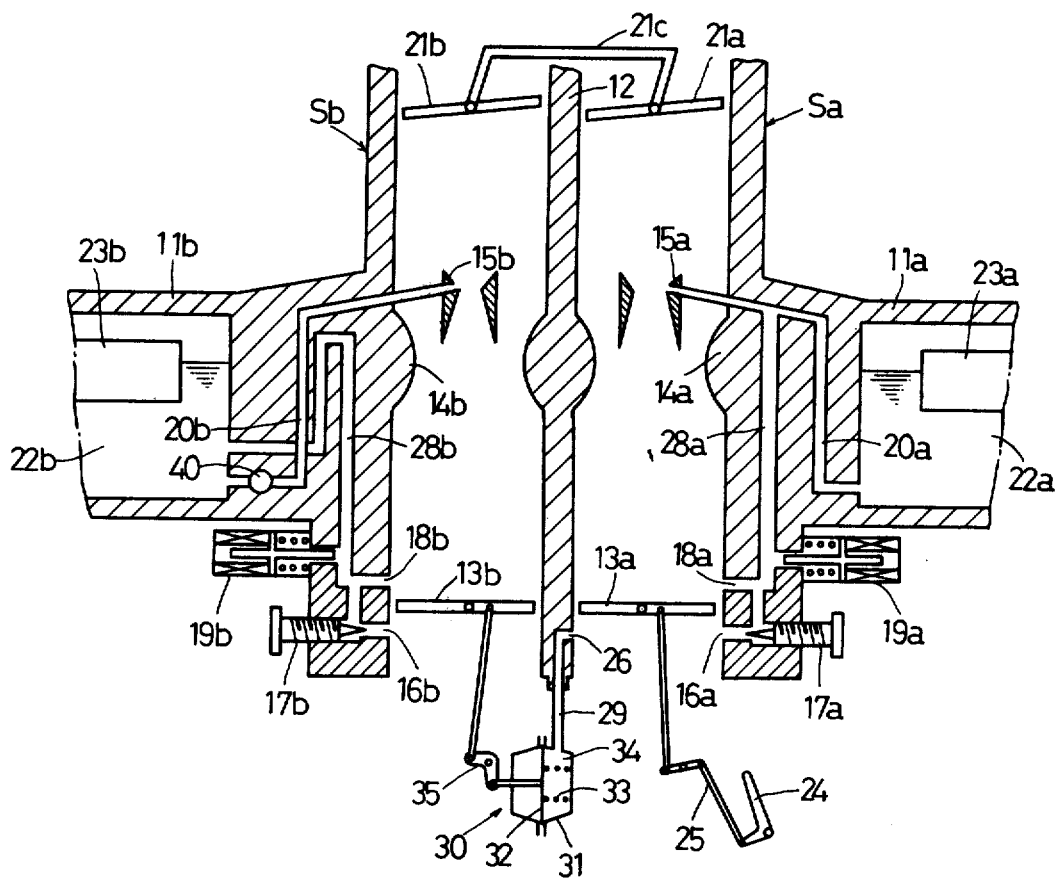
FIG. 3 is a fragmentary enlarged horizontal sectional view of the engine shown in FIG. 1.

Referring to FIG. 1 of the drawings, there is shown an internal combustion engine having a series of four cylinders $C_1$, $C_2$, $C_3$ and $C_4$. An outer pair of cylinders $C_1$ and $C_4$ are connected to a primary intake manifold $1a$, and an inner pair of cylinders $C_2$ and $C_3$ to a secondary intake manifold $1b$. The reference number 2 indicates a cylinder head. Each of the cylinders $C_1$, $C_2$, $C_3$ and $C_4$ is provided with an intake port 3 communicating with the corresponding intake manifold $1a$ or $1b$, and an exhaust port 5 communicating with one of two inlet ports 4 to a reactor 6. A layer of oxidizing catalyst 64 may be provided downstream of the reactor 6. The reference numbers 7, 8, 9 and 10 in FIG. 2 indicate an intake valve, an exhaust valve, a piston and a combustion chamber, respectively, of each cylinder. The primary and secondary intake manifolds $1a$ and $1b$ communicate with a primary intake system $Sa$ and a secondary intake system $Sb$, respectively, each of which includes a carburetor $11a$ or $11b$. The two intake systems $Sa$ and $Sb$ are contiguous to each other with a partition 12 therebetween. It is to be understood throughout this specification that the suffixes $a$ and $b$ added to various reference numerals used in the drawings indicate the constituent parts of the primary and secondary intake system $Sa$ and $Sb$, respectively. The reference numbers $13a$ and $13b$ indicate throttle valves provided in the primary and secondary intake systems $Sa$ and $Sb$, respectively. The reference numbers $14a$ and $15a$ indicate a large venturi channel and a small venturi channel, respectively, in the primary intake system $Sa$ while the reference numbers $14b$ and $15b$ indicate a large venturi channel and a small venturi channel, respectively, in the secondary intake system $Sb$. The reference numbers $16a$ and 16b indicate idling ports of the primary and secondary intake systems Sa and Sb, respectively, and the reference numbers 17a and 17b show adjust screws for the idling ports 16a and 16b, respectively. The reference numbers 18a and 18b indicate slowing ports of the primary and secondary intake systems Sa and Sb, respectively, and a pair of solenoid valves 19a and 19b are provided to cut off the supply of fuel through the idling ports 16a and 16b and the slowing ports 18a and 18b. The reference numbers 20a and 20b indicate main fuel paths leading respectively to the small venturi chennels 15a and 15b of the carburetors 11a and 11b, and the reference numbers 21a and 21b indicate choke valves positioned upperstream of the large venturi channels 14a and 14b in the primary and secondary intake systems Sa and Sb, respectively, and connected by a choke line 21c. The reference numbers 22a and 22b indicate fuel in the carburetors 11a and 11b, respectively, and the reference numbers 23a and 23b indicate floats. An accelerator pedal 24 is connected with the throttle valve 13a by a link mechanism 25.

A pair of idling and slowing passages 28a and 28b are provided respectively in the carburetors 11a and 11b and communicate with the slowing and idling ports 18a and 16a of the primary intake system Sa and slowing and idling ports 18b and 16b of the secondary intake system Sb, respectively.

A secondary port 26 is provided in the partition 12 downstream of the throttle valve 13a in its position for engine idling. The secondary port 26 communicates through a passage 29 with a negative pressure chamber 34 of a throttle valve controlling device 30 comprising a diaphragm 32 and a spring 33 confined in a housing 31. The diaphragm 32 is connected with the throttle valve 13b of the secondary intake system Sb by a link work 35 and when a negative pressure develops at the secondary port 26, the throttle valve 13b makes a turn into its closed position closing under the action of the diaphragm 32 and the link work 35.

A fuel supply controlling device 40 is provided in the main fuel passage 20b of the carburetor 11b. As shown in FIG. 4, the fuel supply controlling device 40 is composed of a two-way cock adapted to open and close the main fuel passage 20b and a link work 42 connected with the accelerator pedal 24 and the choke link 21c for rotating the two-way cock 41. The controlling device 40 maintains the main fuel passage 20b closed unless a predetermined amount of downward pressure is applied to the accelerator pedal 24, but it rotates to open the main fuel passage 20a upon application of such an amount of or higher pressure on the accelerator pedal 24. Moreover, as long as the choke valves 21a and 21b remain closed, the link work 42 connected with the choke link 21c stays in its position to maintain the main fuel passage 20b open.

FIG. 5 shows another fuel supply controlling device 50. The fuel supply controlling device 50 is mounted on the carburetor 11b and comprises a housing 51, a diaphragm 52 in the housing 51 defining a pair of negative pressure chambers 53a and 53b and a spring 54 in the chamber 53a. The negative pressure chamber 53a has a port 55a connected with a negative pressure output (not shown) of the primary intake manifold 1a. The other negative pressure chamber 53b has a port 55b connected with a negative pressure output (not shown) of the secondary intake manifold 1b. The diaphragm 52 is connected to a valve member 56 adapted to open and close the main fuel passage 20b of the carburetor 11b.

The valve member 56 has an aperture 57 which establishes continuity through the main fuel passage 20b upon its alignment therewith. As long as downward pressure applied to the accelerator pedal 24 is below a predetermined level and the throttle valve 13b is fully open, there exists a large negative pressure in the negative pressure chamber 53a and the valve member 56 is in its raised position against the action of the spring 54 to keep the main fuel passage 20b closed, but when the pressure applied on the accelerator pedal 24 increases to or above the predetermined level, the pressure in the negative pressure chamber 53a rises and the valve member 56 is lowered under the action of the spring 54, so that its aperture 57 aligns with the main fuel passage 20b as shown in FIG. 5 for supplying fuel to the secondary intake system Sb through the small venturi 15b. When the choke valves 21a and 21b are in their closed position, the pressure in the first intake manifold 1a is equivalent to that of the secondary intake manifold 1b and the valve member 56 is in its lowered position under the action of the spring 54, so that its aperture 57 is in line with the main fuel passage 20b. FIG. 6 shows a conventional distributor 60 for controlling the timing for ignition comprising a distributor proper and a negative pressure controlling device 62. The negative pressure controlling device 62 includes a negative pressure chamber 63 defined by a diaphragm and communicating with a negative pressure controlling port 27 provided in the first intake manifold 1a, whereby the ignition timing of the engine is controlled according to automobile speed and load.

The operation of the engine as hereinabove described will be explained in accordance with the various phases thereof.

1. Starting Operation

Before the engine is placed in operation, the throttle valve 13b is fully open in its position rotated counterclockwise under the action of the diaphragm 32 and the link work 35 of the throttle valve controlling device 30 because there is no negative pressure at the secondary port 26. The following three modes of starting operation will be considered and described, as well as idling operation:

a. Starting from Cold without Utilizing the Choke Valves 21a and 21b

The throttle valve 13a of the primary intake system Sa is in its idling position. When the engine is started, a negative pressure is generated at the secondary port 26 to displace the diaphragm 32 of the throttle valve controlling device 30 to the right as viewed in FIG. 3, and the throttle valve 13b then in its fully open position is pulled by the link work 35 and rotates into its idling position, whereby fuel is supplied through the slowing passages 28a and 28b and the idling ports 16a and 16b into all the cylinders $C_1$, $C_2$, $C_3$ and $C_4$ to allow them to cooperate to place the engine in its idling operation.

b. Re-starting

As the throttle valve 13b of the secondary intake system Sb is fully open, the fuel-air mixture then available is not too rich, but retains its mixing ratio at a level which is obtained when the throttle valve 13a is opened, so that the engine can be re-started with the fuel-air mixture supplied through the secondary intake system Sb. After the engine is re-started the throttle valve 13b is rotated from its fully open position to its idling position by a negative pressure generated at the secondary port 26 and all cylinders cooperate to place the engine in its idling operation.

c. Re-starting from Cold by Utilizing the Choke Valves 21a and 21b

In this case, a fuel-air mixture which is optimum for starting the engine is supplied to all cylinders. When the engine is started an appropriate negative pressure develops at the secondary port 26 and the throttle valve 13b is rotated to its first idling position by the throttle valve controlling device 30 and the link work 35. The throttle valve 13a of the primary intake system Sa is also in its first idling position and while the choke valves 21a and 21b are in their closed position, the fuel supply controlling device 40 or 50 keeps the main fuel passage 20b open to allow all the cylinders $C_1$, $C_2$, $C_3$ and $C_4$ to cooperate to place the engine in its first idling operation. After the engine is warmed up, the choke valves 21a and 21b are fully opened and when the throttle valve 13a is turned to its idling position the throttle valve 13b is also turned to its idling position to allow all cylinders to cooperate to place the engine in its idling operation.

2. Operation at Medium or Light Loads

During this phase of operation, the accelerator pedal 24 receives application of a predetermined amount of downward pressure thereon. In the first intake system Sa, fuel spouts out from the small venturi 15a through the main fuel passage 20a so that a fuel-air mixture having an optimum mixing ratio is supplied into the cylinders $C_1$ and $C_4$. On the other hand, in the second intake systems Sb, while elevation in pressure at the secondary port 26 allows the throttle valve 13b to fully open as the result of the relative movements of the throttle valve controlling device 30 and the link work 35, the fuel supply controlling device 40 or 50 maintains the main fuel passage 20b closed, so that the cylinders $C_2$ and $C_3$ receive no fuel, but only air. Thus, the cylinders $C_1$ and $C_4$ are intended to generate a power output which is as large as that provided by a conventional engine where fuel, when supplied, is supplied to all of its cylinders together, to that the throttle valve 13a opens wider than its counterpart in the conventional engine to thereby deliver an optimum fuel-air mixture to the cylinders $C_1$ and $C_4$, while the throttle valve 13b in the second intake system Sb fully opens for supplying only air to the cylinders $C_2$ and $C_3$. Consequently, the engine of this invention has a higher combustion efficiency and its pumping and friction losses are reduced by half, with a resultant drastic reduction in its fuel consumption and its discharge of harmful exhaust gas. In addition, fluctuations in the torque of the engine are diminished because only air is compressed and expanded in the cylinders $C_2$ and $C_3$. Moreover, the exhaust ports 5 of the cylinders $C_2$ and $C_3$ join the exhaust ports 5 of the cylinders $C_1$ and $C_4$, respectively, in the cylinder head 2, whereby the air from the cylinders $C_2$ and $C_3$ assists in purifying the exhaust gas by burning the uncombusted hydrocarbon (HC) and carbon monoxide (CO) carried over from the cylinders $C_1$ and $C_4$. Thus, such a supply of air available from the cylinders $C_2$ and $C_3$ eliminates the necessity for provision of a special air pump for recombustion of exhaust gases from the exhaust ports 5 of the cylinders $C_1$ and $C_4$, whereby the total pumping losses of the engine are further reduced as much. It will be apparent that other exhaust gas purifying systems using the air from the cylinders $C_2$ and $C_3$ for re-burning the exhaust gas, for example, a purifying system employing a layer of an oxidizing catalyst, fall within the spirit and scope of the present invention. The primary intake manifold 1a is used as a source of negative pressure for ignition timing control, because the pressure prevailing in the secondary intake system 1b is substantially equal to atmospheric pressure.

It will be obvious, within the spirit and scope of this invention, to use for recombustion of exhaust gases for their purification the air supplied from one or more cylinders where no combustion occurs during operation at medium or light loads. While in the embodiment as hereinabove described, the primary intake manifold 1a into which a fuel-air mixture is supplied is preferably larger in length than the secondary intake manifold 1b into which only air is introduced during operation at medium or light loads, in order to raise the temperature of the fuel-air mixture, yet the invention should not be considered to be limited to such arrangements, but may be equally advantgeously utilized in other situations, for example, in which the operational relationship between the primary and secondary intake manifolds during operation at medium or light loads is reversed.

3. Operation at Heavy Loads

This is a situation in which a downward pressure which is higher than its predetermined level is applied to the accelerator pedal 24. In the primary intake system Sa, the fuel 22a spouts out through the small venturi 15a to form an appropriate fuel-air mixture, while also in the secondary intake system Sb, the fuel 22b spouts out through the small venturi 15b to form an appropriate fuel-air mixture, as the throttle valve 13b is fully opened and the fuel supply controlling device 40 or 50 opens the main fuel passage 20b. Thus, an optimum fuel-air mixture is supplied to all cylinders $C_1$, $C_2$, $C_3$ and $C_4$.

FIG. 7 shows an internal combustion engine 200 adapted for operation with a lean fuel-air mixture, which includes an auxiliary combustion chamber 202 in a cylinder head 201. The auxiliary combustion chamber 202 communicates with a main combustion chamber 203 through a passage 204 in which electrodes 205a and 205b of a spark plug 205 are located. The reference number 206 indicates a piston and 207 indicates an intake valve. This engine is generally adapted for operation with a uniformly lean fuel-air mixture having a fuel to air ratio of 1 to 16–20.

Figure 8:
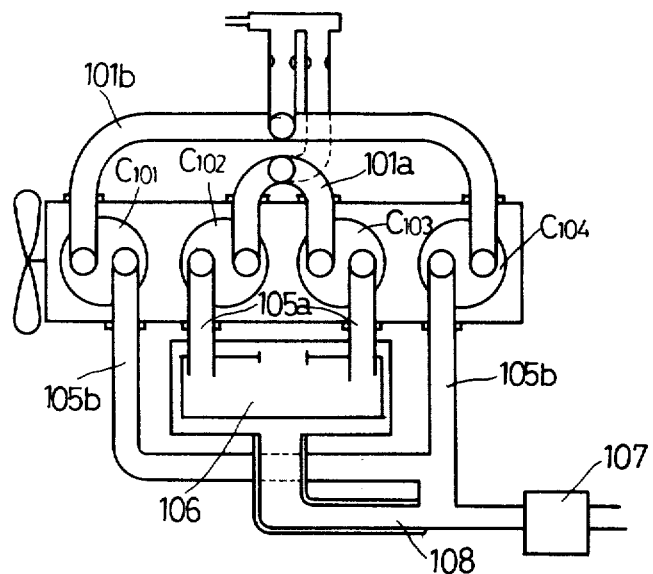
FIGS. 8 and 9 are each a schematic plan view of another embodiment of this invention in which an exhaust gas purifying system is incorporated.
Figure 9:
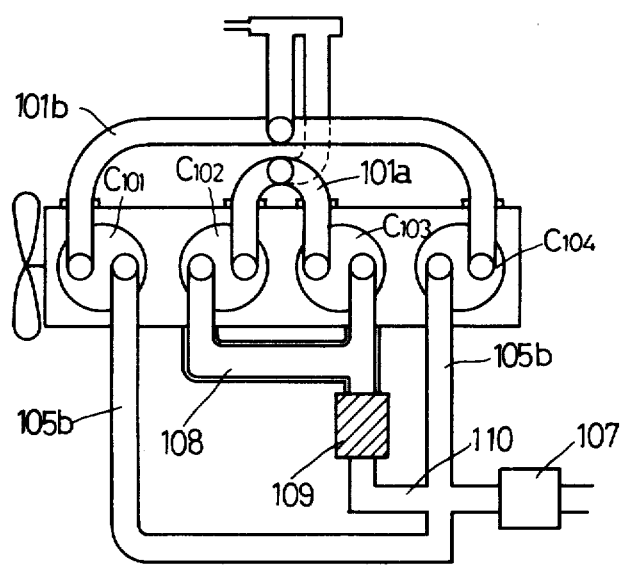

An engine shown in each of FIGS. 8 and 9 is a modification to the engine of FIG. 1 modified by incorporating cylinders having auxiliary combustion chambers in the primary intake system. The engine comprises an outer pair of cylinders $C_{101}$ and $C_{104}$ having no auxiliary combustion chamber and communicating with a secondary intake manifold 101b and an inner pair of cylinders $C_{102}$ and $C_{103}$ each having an auxiliary combustion chamber and commuicating with a primary intake manifold 101a. The reference number 105a indicates a pair of exhaust pipes for the cylinders $C_{102}$ and $C_{103}$, respectively, while 105b indicates a pair of exhaust pipes for the cylinders $C_{101}$ and $C_{104}$.

In FIG. 8, each of the exhaust pipes 105a forms an inlet pipe to a heat insulated exhaust manifold 106 to which a heat insulated exhaust pipe 108 having a muffler 107 installed therein is connected. The exhaust pipes 105b are connected to the heat insulated exhaust pipe 108 upstream of the muffler 107.

The arrangement shown in FIG. 9 includes a different heat exhaust pipe 108 connected to a layer of oxidizing catalyst 109 and the exhaust pipes 105b for the outer cylinders $C_{101}$ and $C_{104}$ are connected with an exhaust pipe 110 extending between the layer of oxidizing catalyst 109 and a muffler 107.

By comparison betwen FIG. 1 and FIGS. 8 and 9, it will be observed that the inner cylinders $C_{102}$ and $C_{103}$ are connected to the primary intake system in FIGS. 8 and 9, while the outer cylinders $C_1$ and $C_4$ are in FIG. 1, so that the engine of FIG. 8 or 9 receives a lean fuel-air mixture therein through its inner cylinders $C_{102}$ and $C_{103}$ during operation at medium or light loads. This arrangement in FIG. 8 or 9 is preferable to make the heat insulated exhaust manifold 106 or the oxidizing catalyst layer 109 compact, and maintain a high gas temperature in the manifold 106 or catalyst layer 109.

In the engine shown in FIG. 8 or 9, a uniformly lean fuel-air mixture having a fuel to air ratio of 1 to 16–20 is supplied to the cylinders $C_{102}$ and $C_{103}$, but only air to the cylinders $C_{101}$ and $C_{104}$, during operation at medium or light loads. Introduction of a lean fuel-air mixture into only a half of the cylinders during operation at medium or light loads brings about drastic reduction in the discharge of uncombusted nitrogen oxide, hydrocarbon and carbon monoxide, as well as in fuel consumption, as compared with the conventional engines adapted for operation with a lean fuel-air mixture in which all of the cylinders receive such a mixture for combustion. Moreover, the exhaust gases discharged from the cylinders $C_{102}$ and $C_{103}$ are subjected to a secondary oxidizing reaction through the heat insulated exhaust manifold 106 or the layer of oxidizing catalyst 109, whereby the amount of uncombusted HC and CO contained in the exhaust gases is further reduced. On the downstream, the air discharged from the cylinders $C_{101}$ and $C_{104}$ mixes with the exhaust gases to cool them to thereby prevent thermal damage to the exhaust system so that the exhaust system of this engine can be made of material of lower quality.

It will be understood that the engine of FIG. 8 or 9 will also receive a supply of an optimum fuel-air mixture through all the cylinders in the primary and secondary intake systems during operation at heavy loads, idling, deceleration, and warming up.

What is claimed is:

1. An internal combustion engine for an automobile comprising:
    a plurality of cylinders;
    a primary intake system communicating with at least one of said cylinders and having a primary carburetor and a primary throttle valve connected to an accelerator pedal;
    a secondary intake system communicating with the remainder of said cylinders and having a secondary carburetor and a secondary throttle valve, said secondary carburetor having a main fuel passage therein;
    a device for controlling said secondary throttle valve adapted for maintaining said secondary throttle valve in the vicinity of its idling position when said primary throttle valve is in the vicinity of its idling position, while allowing said secondary throttle valve to fully open after said primary throttle valve is considerably turned away from its idling position; and,
    a fuel supply controlling device adapted to close said main fuel passage in said secondary carburetor when said primary throttle valve is open to an extent narrower than a predetermined level, but open said main fuel passage upon further opening of said primary throttle valve to at least said predetermined level, said fuel supply controlling device comprising a diaphragm valve provided in said main fuel passage and having two negative pressure chambers and a pair of passages, one of which connects one of said negative pressure chambers with an intake manifold in said primary intake system, while the other passage connects the other negative pressure chamber with an intake manifold in said secondary intake system.

2. An engine as set forth in claim 1, wherein said diaphragm valve comprises a casing, a diaphragm housed in said casing and partitioning it for defining said two negative pressure chambers, a valve member attached to said diaphragm to open and close said main fuel passage and having an aperture, the diameter thereof being substantially equal to that of said main fuel passage, and a compression spring housed in said negative pressure chamber connected with said intake manifold in said primary intake system.

3. An engine as set forth in claim 1, wherein each of said primary and secondary intake systems has a choke valve.

4. An engine as set forth in claim 1, wherein said device for controlling said secondary throttle valve comprises a negative pressure port provided in said primary intake system adjacent to said primary throttle valve, a diaphragm valve adapted for actuation by a negative pressure at said negative pressure port and a link work connecting said diaphragm valve with said secondary throttle valve.

5. An engine as set forth in claim 1, wherein said at least one cylinder includes a main combustion chamber and an auxiliary combustion chamber.

6. An engine as set forth in claim 1, further including a negative pressure actuated ignition timing control device having a diaphragm chamber communicating with an intake manifold in said primary intake system.

7. An engine as set forth in claim 1, further including a heat insulated exhaust manifold provided downstream of said at least one cylinder.

8. An engine as set forth in claim 1, further including a layer of oxidizing catalyst provided downstream of said at least one cylinder.

9. An internal combustion engine for an automobile comprising:
    a plurality of cylinders;
    a primary intake system communicating with at least one of said cylinders and having a primary carburetor and a primary throttle valve connected to an accelerator pedal;
    a secondary intake system communicating with the remainder of said cylinders and having a secondary carburetor and a secondary throttle valve, said secondary carburetor having a main fuel passage therein;
    a device for controlling said secondary throttle valve adapted for maintaining said secondary throttle valve in the vicinity of its idling position when said primary throttle valve is in the vicinity of its idling position, while allowing said secondary throttle valve to fully open after said primary throttle valve is considerably turned away from its idling position; and,
    a fuel supply controlling device adapted to close said main fuel passage in said secondary carburetor when said primary throttle valve is open to an extent narrower than a predetermined level, but open said main fuel passage upon further opening of said primary throttle valve to at least said predetermined level, said fuel supply controlling device comprising a cock provided in said main fuel passage and a link mechanism connecting said cock with said throttle valve in said primary intake system.

10. An engine as set forth in claim 9, wherein said device for controlling said secondary throttle valve comprises a negative pressure port provided in said primary intake system adjacent to said primary throttle valve, a diaphragm valve adapted for actuation by a negative pressure at said negative pressure port and a link work connecting said diaphragm valve with said secondary throttle valve.

* * * * *